United States Patent [19]

Alvarez et al.

[11] 4,334,666
[45] Jun. 15, 1982

[54] EXPANDING GATE VALVE WITH POSITION RESPONSIVE INTERLOCK

[75] Inventors: Patricio D. Alvarez, Rosenberg; Robert J. Trevino, Houston, both of Tex.

[73] Assignee: ACF Industries, Incorporated, New York, N.Y.

[21] Appl. No.: 145,903

[22] Filed: May 2, 1980

[51] Int. Cl.³ ............................................. F16K 25/00
[52] U.S. Cl. ..................................... 251/167; 251/196; 251/237
[58] Field of Search ............... 251/159, 167, 196, 327, 251/328, 249, 246, 237

[56] References Cited

U.S. PATENT DOCUMENTS

| | | | |
|---|---|---|---|
| 2,002,780 | 5/1935 | Laurent | 251/196 |
| 2,360,695 | 10/1944 | Linden | 251/249 X |
| 2,855,175 | 10/1958 | Dunbar | 251/196 |
| 4,188,014 | 2/1980 | Alvarez | 251/167 X |

*Primary Examiner*—Harold W. Weakley
*Attorney, Agent, or Firm*—Stephen T. Belsheim; Marvin J. Marnock

[57] ABSTRACT

A gate valve (10) has an expanding gate assembly (34) mounted in the valve chamber (14) for movement between open and closed positions. The gate assembly (34) includes a gate (44) connected to a valve stem (28) and a segment (52) is carried by the gate (44). The gate (44) and segment (52) each have wedging surfaces (46 and 54) which permit a wedging action to provide lateral expansion therebetween at the open and closed positions. A rocker arm (80) is pivotally mounted to a side (49) of the gate (44). The rocker arm (80) has a slot (102) with a bearing block (104) slidably received therein. A bearing pin (110) extends from a side (57) of the segment (52) and is journaled in the bearing block (104). A seat skirt (60) is contained within the valve chamber (14) and engages the rocker arm (80) so as to control the ability of the rocker arm (80) to pivot about the gate (44) thereby allowing the gate (44) and segment (52) to expand from each other at a preselected position in the travel of the gate assembly (34). A modification of the structure provides a recess (120) in the sides (49A and 57A) of the gate (44A) and segment (52A). A shoulder (126) protrudes from one side of the rocker arm (80A) and is received within the recess (120) whereby the rocker arm (80A) continues to function as before.

4 Claims, 6 Drawing Figures

EXPANDING GATE VALVE WITH POSITION RESPONSIVE INTERLOCK

BACKGROUND OF THE INVENTION

The invention relates to expanding gate valves, and in particular, to expanding gate valves that have a position responsive interlock which controls the relative position of the gate and segment.

Heretofore, position responsive interlock assemblies have been utilized with an expanding gate valve to maintain the gate and segment in a collapsed position during travel between open and closed positions and to permit the gate and segment to expand at the open and closed positions of the gate valve assembly. Specific examples of earlier U.S. patents relating to gate valve interlocks are the U.S. Pat. No. 2,583,512 for a "Gate Valve" issued to Laurent on Jan. 22, 1952, the U.S. Pat. No. 2,855,175 for a "Gate Valve" issued to Dunbar on Oct. 7, 1958, and the U.S. Pat. No. 4,188,014 for "Gate Valve with Position Responsive Interlock" issued to Alvarez on Feb. 12, 1980.

Heretofore, the gate and segment have expanded from each other by movement through a pin-slot arrangement. Even though the movement through this arrangement was satisfactory, the stresses between the pin and slot acted on a relatively small area which resulted in galling of the pin and slot. This galling required the premature shutdown of the valve to perform the necessary maintenance. Thus, it would be highly desirable to provide an improved position responsive interlock assembly for use with an expanding gate valve wherein the galling of the pin and slot is reduced.

Earlier devices utilize seat skirts that have mediately disposed recesses and the like formed in their flanges. These recesses are generally formed by special manufacturing operations which result in increased production costs. Further, the removal of material to form these recesses reduces the strength of the flange along its length. Thus, it would be highly desirable to provide an improved position responsive interlock assembly for use with an expanding gate valve wherein the seat skirt thereof does not contain any specially formed recesses and the like thereby eliminating any special and generally relatively expensive manufacturing operations as well as providing a seat skirt that is of an optimum strength along its entire length.

In earlier devices, before the rocker arm can pivot into a locking position, it must overcome its tendency to pivot about the point where it engages the skirt. This tendency impedes the rocker arm from quickly moving into a locking position upon the displacement of the gate assembly from its expanded position. Thus, it would be highly desirable to provide an improved position responsive interlock assembly for use with an expanding valve wherein the rocker arm thereof more easily overcomes its tendency to pivot about the point where it engages the skirt.

SUMMARY OF THE INVENTION

It is an object of the invention to provide an improved position responsive interlock assembly for used with an expanding gate valve wherein the expansion of the gate element and segment members does not gall the pin and slot arrangement through which these members move.

It is another object of the invention to provide an improved position responsive interlock assembly for use with an expanding gate valve wherein the seat skirt thereof is relatively inexpensive to manufacture and is of an optimum strength along the entire length thereof.

It is another object of the invention to provide an improved position responsive interlock assembly for use with an expanding gate valve wherein the rocker arm more easily overcomes its tendency to pivot about the point where it engages the skirt flange.

The invention is a position responsive interlock for use with an expanding gate valve. The gate valve has a valve chamber and an expanding gate assembly mounted therein for movement between open and closed positions. The expanding gate assembly includes a gate member connected to a valve stem and a segment member carried by the gate member with wedging surfaces between the members permitting a cooperative wedging action which provides lateral expansion therebetween at the fully open and closed positions of the gate valve assembly. An elongate member or rocker arm is pivotally mounted to a side of one of the expanding gate assembly members. The elongate member has a slot in which a bearing member is slidably received. A pin extends from a side of the other member and is journaled within the bearing member. A means, or a seat skirt that has flanges, is contained within the valve and engages the rocker arm so as to govern the ability of the elongate member to pivot about the one member which thereby allows the gate and segment members to expand from each other only at a preselected position or positions in the travel of the gate valve assembly.

DETAILED DESCRIPTION OF A SPECIFIC EMBODIMENT

Figure 1:
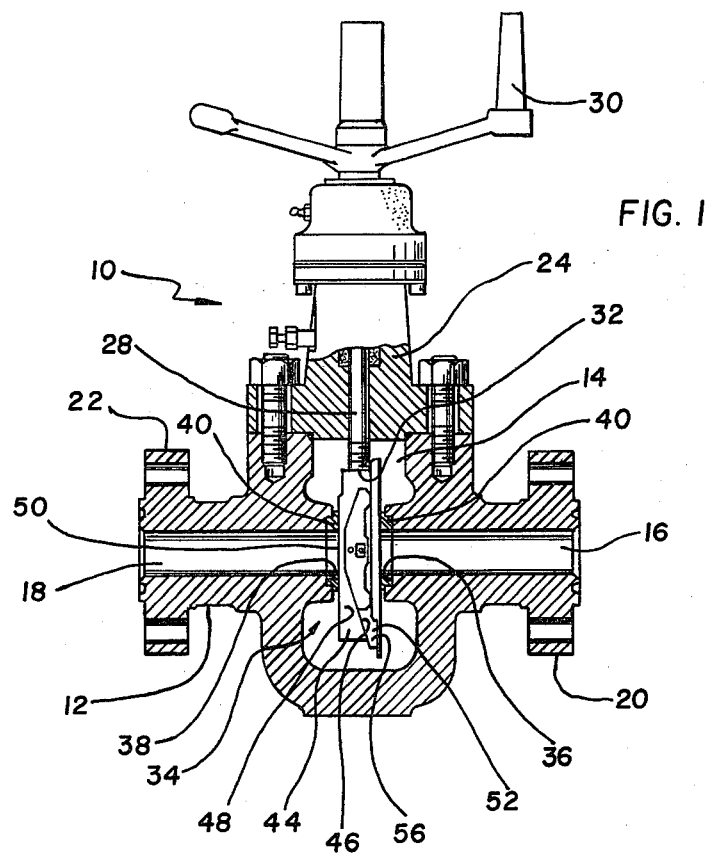
FIG. 1 is a sectional view, certain portions shown in elevation, of the gate valve structure embodying the present invention shown in the embodiment illustrated in FIGS. 3 and 4.
Figure 2:
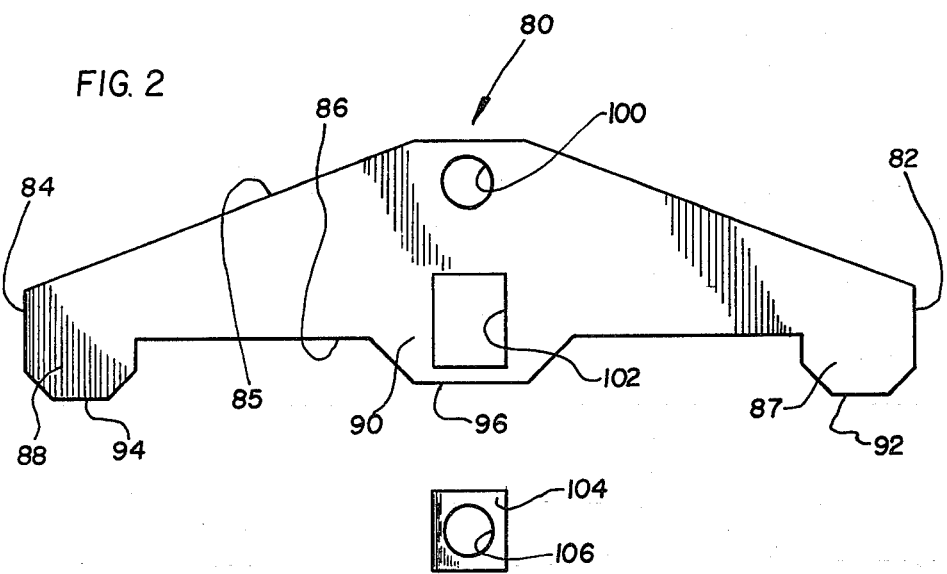
FIG. 2 is a front view of the rocker arm and bearing block shown in FIGS. 1 and 3-4 removed from the valve chamber and with the bearing block and pin removed from the slot of the rocker arm.

Referring now to the drawings for a better understanding of the invention and more particularly to the embodiment of the invention shown in FIGS. 1-4, there is illustrated the gate valve of the invention generally designated at 10. Gate valve 10 includes a valve body 12 having a valve chamber 14, therein. Inlet and outlet flow passages 16 and 18 communicate with valve chamber 14. Flanges 20 and 22 at the ends of valve body 12 may be suitably connected to a pipeline or other flow system as is well known in the art. A bonnet 24 is bolted to valve housing 12. A valve stem 28 is positioned within the bonnet 24 in a conventional fashion for reciprocating movement with respect thereto, and has the outward end thereof (not illustrated) connected to a handwheel 30 and the inward end 32 thereof connected to a gate member 44 in a conventional fashion. Valve housing 12 includes a pair of annular recesses 36 and 38 formed or cut therein and extending around the portions of inlet and outlet flow passages 16 and 18, respectively, adjacent valve chamber 14. A seat element 40 is positioned or fit within each one of annular recesses 36 and 38. The expanding gate valve assembly generally designated at 34 is positioned within valve chamber 14 for reciprocal movement therein in a direction generally transverse to the direction of flow between open and closed positions. Gate assembly 34 is generally comprised of a gate or gate member 44, a segment or segment member 52, and the position responsive interlock assembly generally designated at 42. Gate 44 and segment 52 have ports therein which allow for the passage of fluid therethrough when gate assembly 34 is in an open position.

Gate 44 includes a V-shaped recess 46 which defines concave upper and lower faces 47 and 48 that intersect to form a recess apex 51, opposite sides 49, and a generally planar sealing surface 50 facing the downstream seat element 40. Segment 52 is positioned opposite gate 44 and has a complementary V-shaped face 54 which defines concave upper and lower faces 55 and 56 that intersect to form a face apex 59, a pair of opposite sides 57, and an outwardly facing surface 58. When gate valve assembly 34 is collapsed, the V-shaped surface of gate 44 and segment 52 fit together so that recess and face apices 51 and 59 are generally coincident.

Figure 3:
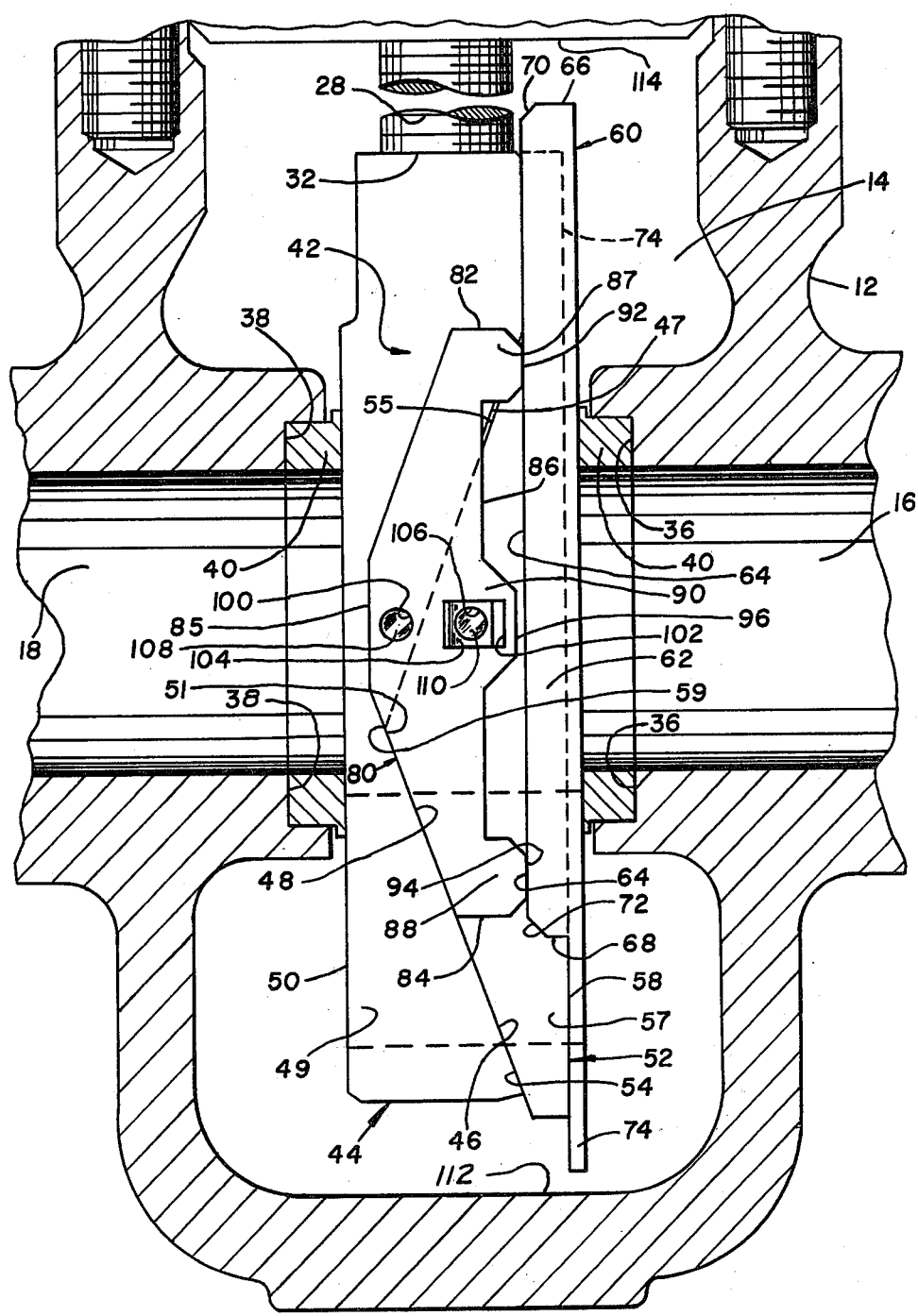
FIG. 3 is a sectional view of a portion of the gate valve assembly shown in FIG. 1 with the gate valve assembly in an intermediate position wherein the position responsive interlock assembly maintains the gate and segment in their fully collapsed position.
Figure 4:
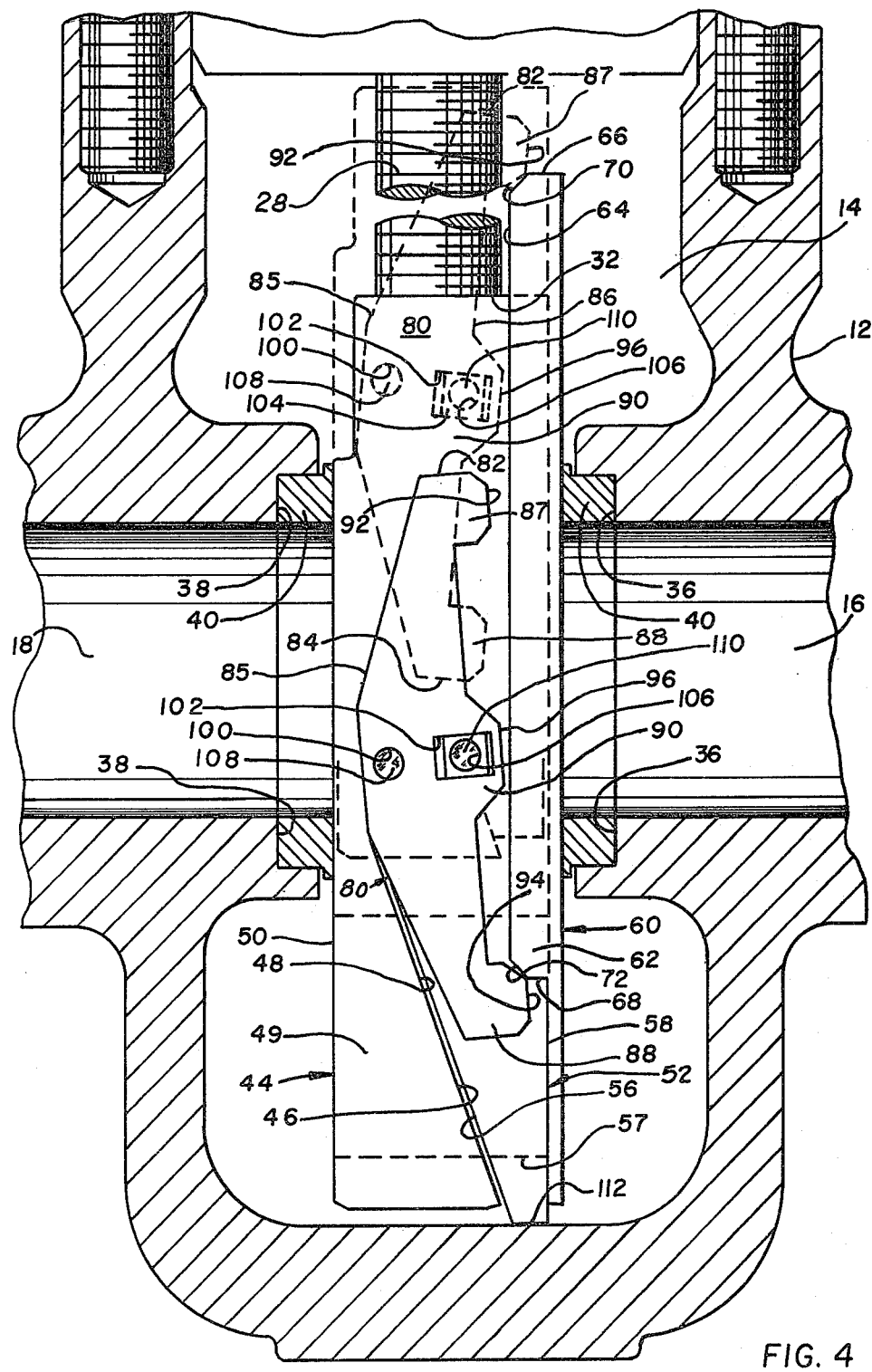
FIG. 4 is a sectional view of a portion of the gate valve assembly shown in FIG. 1 with the dashed lines showing the gate valve assembly in its open position, and the solid lines showing the gate valve assembly in its closed position wherein the position responsive interlock allows the gate and segment to reach their expanded position.

Forming an important feature of applicant's invention is the position responsive interlock assembly which allows gate 44 and segment 52 to expand when gate assembly 34 is in either an open or closed position thereby forming an effective seal between it and seats 40, but maintaining gate 42 and segment 52 in collapsed position when traveling between the open and closed positions thereby reducing the chances that seats 40 will bind gate assembly 34. Position responsive interlock assembly 42 is primarily comprised of a seat skirt 60 and a rocker arm 80 and the accompanying structure connecting rocker arm 80 to gate 44 and segment 52. Seat skirt 60 is positioned between segment 52 and the downstream seat element 40. Seat skirt 60 has a pair of generally parallel and spaced apart inwardly extending elongate flanges 62 joined by a generally planar skirt body 74. FIGS. 1 and 3-4 illustrate only one flange 62 and hereinafter only the illustrated flange 62 and the structure associated therewith will be discussed. Flange 62 includes an elevated smooth sliding surface 64 with beveled portions 70 and 72 adjacent the opposite ends 66 and 68 thereof, respectively.

An elongate member or rocker arm 80 has opposite ends 82 and 84, and edges 85 and 86. A pair of projections 87 and 88 extend downwardly from one edge 86 (the right hand edge as viewed in FIGS. 1, 3-4) adjacent opposite ends 82 and 84, respectively. Projections 87 and 88 have respective smooth sliding surfaces 92 and 94. Rocker arm 80 further includes a circular aperture 100 and a rectangular slot 102. A bearing block 104 has a cylindrically shaped passageway 106 therein and is slidably received within slot 102 for only longitudinal movement therein. A pivot pin 108 extends from side 49 of gate 44 and is journaled within aperture 100. A bearing pin 110 extends from side 57 of segment 52 and is journaled within bearing block passageway 106. Thus, rocker arm 80 is pivotally connected to gate 44, and pivotally and slidably connected to segment 52.

Referring to FIG. 3, rocker arm 80 is aligned in the general direction of movement of expanding gate valve assembly 34 so as to be in its so-called locking position. Sliding surfaces 92 and 94 of projections 87 and 88, respectively, are generally parallel to and slidingly engage elevated sliding surface 64 of skirt flange 62 so that rocker arm 80 slides along skirt flange 62 and is prevented from pivoting. Consequently, gate 44 and segment 52 are maintained in their collapsed position as long as sliding surfaces 92 and 94 engage the elevated sliding surface 64.

Referring to FIG. 4, when expanding gate valve assembly 34 approaches its closed position, segment 52 encounters the lower portion of valve chamber 14 and ceases its downward movement. Skirt flange 62 is dimensioned so that just prior to segment 52 encountering valve chamber 14, lower projection 88 passes other flange end 68 (the end nearest the bottom of valve chamber 14) whereby rocker arm 80 is then free to pivot about pivot pin 108 in a counter clockwise direction as viewed in FIGS. 1, 3 and 4. After segment 52 has ceased moving, gate 44 continues to move downward a slight distance relative thereto which displaces pivot pin 108 relative to bearing pin 110 from their original alignment. In response to this displacement, rocker arm 80 rotates in a counter clockwise direction as viewed in FIGS. 1, 3 and 4. As gate valve assembly 34 moves into its closed position the upper faces of V-shaped recess 46 and face 54 wedge together whereby gate 44 and segment 52 expand away from each other by bearing block 104 and bearing pin 110 moving through slot 102. The contact stresses associated with this movement are distributed by bearing block 104 to a sufficient degree such that no galling of bearing pin 110, bearing block 104 or slot 102 occurs whereby premature maintenance and shutdown of the valve are reduced.

Upon the initial upward movement of valve stem 28 that displaces gate valve assembly 34 from its closed position, gate 44 moves upwardly relative to segment 52. As a result thereof, pivot pin 108 and bearing pin 110 move into general transverse alignment and rocker arm 80 simultaneously rotates clockwise into its locking position.

While in its closed position, a significant fluid pressure is built up on the upstream side of expanding gate valve assembly 34 which causes rocker arm 80 to exert a potentially damaging blow to skirt flange 62. Thus, it is advantageous that applicant's rocker arm 80 and skirt flange 62 are dimensioned so that rocker arm 80 strikes skirt flange 62 at a location where it is supported by valve seat 40 and thus, reduces the possibility that skirt flange 62 would be damaged.

Figure 5:
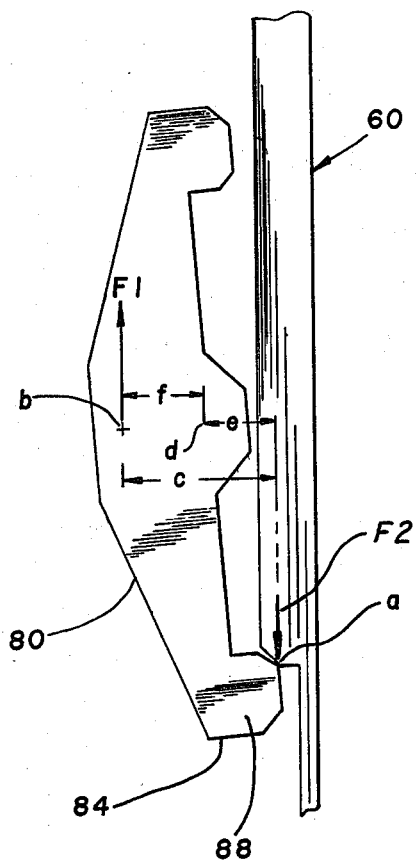
FIG. 5 is a plan view of a rocker arm and seat skirt comparatively illustrating the forces acting on the rocker arm when displaced from its closed position for applicant's specific embodiment and the embodiment illustrated in the U.S. Pat. No. 4,188,014.

Referring to FIG. 5, when gate valve assembly 34 is collapsed from its closed position, rocker arm 80 tends to rotate about the point (point "b"). The rocker arm projection 88 engages the beveled portion of skirt flange 62, and provides a resistive force at point "a" to rocker arm 80 pivoting about its intended pivot point which is the point where rocker arm 80 is pivotally connected to gate 44 (illustrated as point "b"). The force (represented by force vector F2) that pushes on the rocker arm 80 acts over the perpendicular distance "c" to aid in overcoming the resistance of the gate 44 and segment 52 to remain in the wedged position.

Still referring to FIG. 5, U.S. Pat. No. 4,188,014 shows a device that has the pivotal connection between the gate assembly and rocker arm at a point (point "d") substantially closer to the edge of the rocker arm adjacent the seat skirt flange than applicant's pivotal connection point "b". The moment of force F2 about point "d" equals the magnitude of force F2 times distance "e". Since distance "c" is greater than distance "e" by distance "f", applicant's force F2 does not have to be as great as similar forces associated with an earlier device (U.S. Pat. No. 4,188,014) to overcome the same resistive force at point "a"; and applicant's invention provides an improved ability to overcome any tendency on the part of the rocker arm to rotate about point "a".

The rocker arm displays the same tendency to improperly rotate when the gate valve is displaced from its open position as when displaced from its closed position. It is overcome in a fashion similar to that described above so that the above discussion will suffice for any further discussion of this aspect of applicant's invention when the gate valve is displaced from its open position.

In a manner generally similar to that previously described for gate valve assembly 34 moving into its closed position, upper projection 87 of rocker arm 80 passes one end 66 of flange 62 just prior to segment 52 encountering the bonnet so that rocker arm 80 is free to rotate in a clockwise direction in response to the displacement of pivot pin 108 when gate 44 moves upwardly relative to segment 52. Gate 44 and segment 52 also expand away from each other by movement of bearing block 104 and bearing pin 110 through slot 102.

The initial downward movement of valve stem 28 causes gate 44 to move downwardly relative to segment 52 which in turn causes pivot pin 108 and bearing pin 110 to move into general transverse alignment and rocker arm 80 to rotate counter clockwise back into its locking position while gate 44 and segment 52 simultaneously collapse together.

Figure 6:
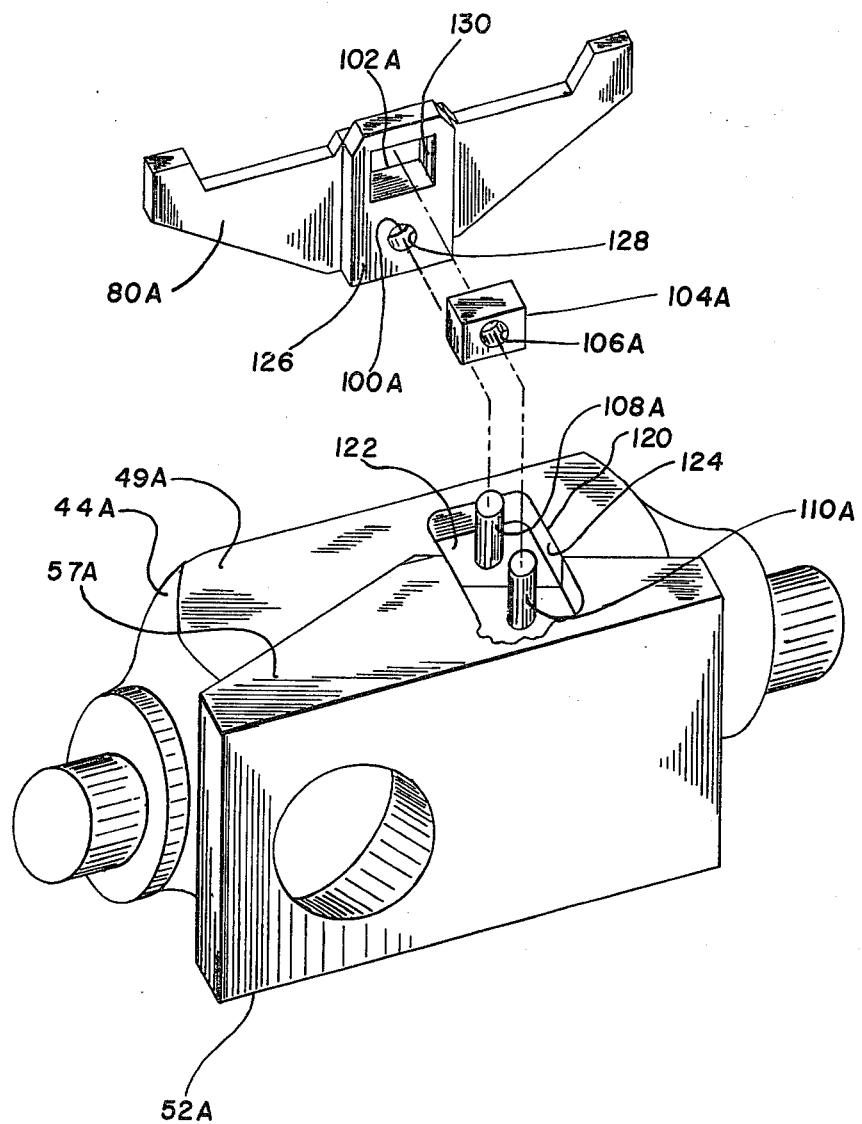
FIG. 6 is a perspective view of a modified rocker arm, gate and segment designed for use with the remainder of the gate assembly as shown in FIGS. 1 and 3-4 wherein the rocker arm and bearing block are exploded away from the gate and segment.

FIG. 6 illustrates a modification of the rocker arm and adjacent sides of the gate and segment of the previously described specific embodiment. The adjacent sides 49A and 57A of gate 44A and segment 52A, respectively, contain a recess 120 therein. Recess 120 has a bottom surface 122 and an upstanding side surface 124. Pivot pin 108A and bearing pin 110A extend outwardly from those portions of bottom surface 122 contained in gate 44A and segment 52A, respectively. Rocker arm 80A includes a shoulder 126 protruding therefrom. Shoulder 126 has a cylindrical passageway 128 therein that joins aperture 100A, and a square passageway 130 therein that joins slots 102A. Pivot pin 108A is journaled within cylindrical passageway 128 and aperture 100A. Bearing block 104A is slidably received within square passageway 130 and the slot 102A. Bearing pin 110A is journaled within passageway 106A.

Recess 120 and shoulder 126 are dimensioned so as to not restrict the operative movement of rocker arm 80A so that the modified structure functions in a manner identical to that of the unmodified specific embodiment described above. Shoulder 126 in cooperation with recess 120 provides additional support to rocker arm 80A so that it may adequately perform its intended function in larger sized applications.

It is seen that applicant's invention provides an expanding gate valve assembly that has an improved position responsive interlock assembly that reduces contact stresses that occur when the gate and segment move laterally of each other. Further, applicant's seat skirt is relatively inexpensive to manufacture, and is of an optimum strength along its length thereof. The rocker arm and seat skirt are positioned so that upon displacement of the valve from its closed position the rocker arm strikes the seat skirt at a point where it is supported by the seat. Finally, applicant's rocker arm more easily overcomes its tendency to rotate about the point where it engages the skirt flange when the gate valve assembly is displaced from its fully expanded position.

What is claimed is:

1. In a gate valve structure of the expanding type having a valve chamber and an expanding gate assembly mounted in the valve chamber for movement between open and closed positions, the gate assembly including a gate member connected to a valve stem and a segment member carried by the gate member with wedging surfaces between the members permitting a wedging action to provide lateral expansion therebetween at fully open and closed positions, where the improvement comprises:

an elongate member pivotally mounted to a side of one of said gate and segment members and having opposite ends, said elongate member having a slot and an aperture, a bearing member slidably received in said slot, and a bearing pin extending from a side of said other of said gate and segment members and journaled within said bearing member;

means, contained within said valve chamber and engaging said elongate member, for governing the ability of said elongate member to pivot thereby allowing said gate and segment members to expand from each other only at a preselected position in the travel of the gate assembly;

a pivot pin extending from said one of said gate and segment members and being journaled within said aperture when said gate assembly is in a fully collapsed position, said aperture and slot being aligned in a direction generally transverse of the direction of movement of the gate assembly with said slot being adjacent said governing means and said aperture being remote from said governing means such that the moment arm of the force couple which acts on said pivot pin and said elongate member at its point of engagement with said governing means for initiating the collapsing movement of said gate assembly exceeds the moment arm of the force couple which acts on said bearing member and said elongate member at its point of engagement with said govering means to thereby minimize the longitudinal force to be applied to said elongate member by said gate assembly in commencing travel of the gate assembly from its fully open and fully closed positions.

2. The improvement of claim 1 wherein said gate member has a V-shaped recess and said segment member has a complementary V-shaped face fitting within said recess when the gate assembly is in a fully collapsed position, said pivot pin extending from said gate member and said bearing pin extending from said segment member with said pivot and bearing pins being aligned generally parallel to and offset in the direction towards the valve stem from a transverse axis passing through the apices of said gate and segment members when the gate assembly is in a fully collapsed position.

3. The improvement of claim 1 wherein said governing means including an elongate sliding surface contained within said valve chamber and disposed so as to be generally parallel to the direction of movement of the expanding gate assembly, said elongate sliding surface being dimensioned so that upon the displacement of the expanding gate assembly from the closed position said projection leading with respect to the movement of the gate contacts said sliding surface at a point opposite from the valve seat whereby the valve seat provides additional support for the sliding surface.

4. A gate valve of the expanding type comprising a valve chamber and an expanding gate assembly mounted in said valve chamber for movement between open and closed positions, said gate assembly including a gate member connected to a valve stem and a segment member carried by said gate member with wedging surfaces between said members permitting a wedging action to provide lateral expansion therebetween at the fully open and closed positions;

a rocker arm pivotally mounted to a side of one of said members at a pivotal connection therewith and slidably mounted to a side of other of said members, said rocker arm having a projection at each opposite end thereof, and also provided with a slot,
a bearing member slidably received in said slot, and
a bearing pin extending from a side of said other gate and segment members and journaled within said bearing member;

a seat skirt mounted in the valve chamber and having a flange extending inwardly towards said valve chamber, with the innermost surface thereof comprising a straight sliding surface, said projections engaging said straight sliding surface of said flange when the gate assembly is in a fully collapsed position, said flange having bevelled end portions at its opposite ends adjacent the uppermost and lowermost position of travel of the gate assembly so that said projection leading with respect to the direction of travel of the gate assembly is disengaged from the sliding surface of said flange when at one of the ends thereof and engages the adjacent bevelled end portion thereby allowing said rocker arm to pivot about said one member once the gate and segment members move relative to each other; and said slot being adjacent said sliding surface of said flange and said pivotal connection being remote from said flange such that the moment arm of the force couple acting on said pivotal connection and said leading projection for initiating collapse of said gate assembly exceeds the moment arm of the force couple acting on said bearing member and said leading projection to thereby minimize the force necessary to release the rocker arm from the end portion of said flange and any tendency of the rocker arm to rotate about the end of said flange when the gate assembly moves from its open and closed positions.

* * * * *